United States Patent [19]

Küsters et al.

[11] Patent Number: 5,119,542
[45] Date of Patent: Jun. 9, 1992

[54] TRANSVERSE END SEAL FOR A FLEXURE-CONTROLLABLE ROLL

[75] Inventors: Karl-Heinz Küsters, Krefeld; Günter Schrörs, Tönisvorst, both of Fed. Rep. of Germany

[73] Assignee: Eduard Kusters Maschinenfabrik GmbH & Co., Fed. Rep. of Germany

[21] Appl. No.: 534,743

[22] Filed: Jun. 7, 1990

[30] Foreign Application Priority Data

Jun. 13, 1989 [DE] Fed. Rep. of Germany ....... 3919208

[51] Int. Cl.⁵ .............................. B21B 13/02
[52] U.S. Cl. .................. 29/116.2; 29/113.1; 29/113.2; 29/116.1; 29/123
[58] Field of Search ............... 29/113.1, 113.2, 116.2, 29/129, 123; 277/81 R, 85, 93.5 D, 96.1

[56] References Cited

U.S. PATENT DOCUMENTS

| | | | |
|---|---|---|---|
| 3,093,382 | 7/1956 | Macks | 277/96.1 X |
| 4,026,564 | 5/1977 | Metcalfe | 277/96.1 |
| 4,307,501 | 12/1981 | Ahrweiler | 29/113 |
| 4,447,063 | 5/1984 | Kotzur et al. | 277/81 R X |
| 4,523,764 | 6/1985 | Albers et al. | 277/96.1 X |
| 4,651,552 | 3/1987 | Ahrweiler | 29/113.2 X |

FOREIGN PATENT DOCUMENTS

| | | |
|---|---|---|
| 0904372 | 7/1972 | Canada . |
| 2025777 | 6/1973 | Fed. Rep. of Germany . |
| 3003395 | 4/1983 | Fed. Rep. of Germany . |
| 3640902 | 6/1988 | Fed. Rep. of Germany . |
| 3813596 | 11/1989 | Fed. Rep. of Germany . |
| 62-17520 | 5/1987 | Japan . |
| 0586288 | 12/1977 | U.S.S.R. ......... 277/93 SD |
| 0717456 | 2/1980 | U.S.S.R. ......... 277/96.1 |
| 0723277 | 3/1980 | U.S.S.R. ......... 277/93 SD |

*Primary Examiner*—Joseph M. Gorski
*Assistant Examiner*—C. Richard Martin

[57] ABSTRACT

In a hydraulically supported roll including a rotatable hollow cylinder and a stationary crosshead, transverse end seals are provided to seal the annular clearance space formed between the crosshead and the inner circumference of the hollow cylinder. Each transverse end seal includes a slide ring having a chamber located on the first surface of the slide ring abutting a counter-ring. The chamber provides hydraulic relief. Radially outside of the chamber a narrow groove is provided which communicates with the low-pressure side of the slide ring via a channel. The channel discharges hydraulic fluid flowing to the first surface of the slide ring as a result of the high pressure in the clearance space.

12 Claims, 2 Drawing Sheets

TRANSVERSE END SEAL FOR A FLEXURE-CONTROLLABLE ROLL

BACKGROUND OF THE INVENTION

The invention relates generally to rolls for treating webs of material and, more particularly, to an improved seal arrangement for sealing the transverse end of a hydraulically supported roll.

Hydraulically supported rolls typically have a rotatable hollow cylinder forming the working roll circumference and a stationary crosshead extending lengthwise through the hollow cylinder to form an annular clearance space with the inner circumference of the hollow cylinder. Hydraulic support means are provided in the annular clearance space for supporting the hollow cylinder. Transverse end seals are mounted at the ends of the hollow cylinder to seal the annular clearance space from external pressure.

The internal hydraulic pressure can be produced by a hydraulic supporting system that includes a chamber shaped as a semi-cylindrical shell that is pressurizable with hydraulic fluid. This chamber is isolated from the rest of the clearance space by the transverse end seals and by longitudinal seals that extend at diametrically opposite sides of the crosshead between the transverse end seals. Such an arrangement is disclosed in Japanese Utility Model 62-17520. A transverse end seal similar to the above-mentioned seal is also disclosed in DE-PS 20 25 777.

In the above-mentioned documents, the transverse end seal defines the so-called "S-roll chamber", which is in the form of a semi-cylindrical shell divided by longitudinal seals and extends in the circumferential direction over approximately 180°. The use of a transverse end seal extending over approximately 180° is also disclosed in DE-PS 30 03 395, in which the pressure in the S-roll is modified by sealing elements that maintain regions of lower pressure.

In other rolls, such as are disclosed in DE-OS 36 40 902, the clearance space between the hollow roll and the crosshead is filled with hydraulic fluid over a 360° region. In these cases, of course, the transverse end seal also extends over 360°.

In many cases, the pressure exerted against the transverse end seal is as great as several tens of bars. The transverse end seals typically include a slide ring mounted on the stationary crosshead and an abutting counter-ring that rotates with the hollow cylinder. The circumferential speed of adjacent, relatively rotatable faces of the rings may be up to 1000 m/min, and the hydraulic fluid may reach a temperature of 250° C. or more. It has been found that under these harsh conditions the hydraulic fluid on the high pressure side of the slide ring tends to flow in a radial direction to the region underneath the slide ring. The pressure of the hydraulic fluid then lifts the slide ring off the fixed counter-ring, thus breaking the seal.

SUMMARY OF THE INVENTION

The invention is directed to providing a transverse end seal of the general type discussed above that avoids the above-mentioned problems and disadvantages.

The invention solves these problems and avoids these disadvantages by providing a transverse end seal for a flexure-controllable roll formed by a rotatable hollow cylinder having a longitudinal axis, an inner circumference and an outer working circumference, and a stationary crosshead extending lengthwise through the hollow cylinder to form an annular clearance space with the inner circumference of the hollow cylinder. Hydraulic support means are disposed at the crosshead and act against the inner circumference for supporting the hollow cylinder. The transverse end seal is mountable at the ends of the hollow cylinder to seal from external pressure the annular clearance space between the inner circumference of the hollow cylinder and the crosshead. Each transverse end seal includes a slide ring having a first side disposed in a sliding plane perpendicular to the longitudinal axis of the hollow cylinder and a second side remote from the first side to which a source of low pressure may be conducted. The slide ring is displaceable in a direction parallel to the longitudinal axis. At least one circumferentially extending chamber has an opening extending in a direction parallel to the longitudinal axis. A counter-surface is carried by the rotatable hollow cylinder such that the first side of the slide ring abuts the counter-surface to form a seal therebetween. The opening in the chamber faces the counter-surface. A groove is disposed in the first side of the slide ring and extends over an entire circumference thereof. The groove is located radially outside the chamber facing the counter-surface and the groove communicates with the source of low pressure. Pressurized hydraulic fluid from the surrounding clearance space may be conducted from the groove to the low pressure source without destroying the integrity of the seal.

One advantage of the invention is that the hydraulic fluid that flows radially from the high pressure side of the slide ring to the sliding surface is immediately conveyed to the low-pressure side of the slide ring. Therefore, the pressure necessary to lift the slide ring off the fixed counter-ring cannot be achieved at the sliding surface. The slide ring is properly biased against the sliding surface of the counter-ring by the high pressure on the pressure side of the seal. Thus, the pressure relieving chamber is presented to the sliding surface to enable the seal to perform its sealing function properly.

The slide ring may have an annular, axially extending shoulder formed on its outer periphery. This axially extending shoulder extends from the second side of the slide ring, which also has an inner circumference. A radially extending shoulder is formed between portions of the crosshead having differing diameters. The axially extending shoulder of the slide ring extends axially over the radial shoulder. An annular recess is formed in the radial shoulder of the crosshead. An O-ring is disposed in the annular recess. A ring is mounted on the O-ring. This ring extends radially over the O-ring and axially over the entire width of the annular recess. The ring abuts against the inner circumference of the axially extending shoulder of the slide ring and it has a low coefficient of friction to facilitate movement relative to the slide ring. In this manner, the slide ring may form a satisfactory seal with the crosshead. Of course, the slide ring must be able to undergo small displacements when deflections of the hollow cylinder occur, and particularly when deflections of the crosshead occur.

The ring abutting against the inner circumference of the axial shoulder of the slide ring may be composed of polytetrafluoroethylene. This material is advantageous because of its low coefficient of friction and also because it has some degree of flexibility.

The slide ring may also have an inner circumference radially spaced from an adjacent portion of the crosshead over which the slide ring is mounted. The second side of the slide ring may be axially spaced from the radial shoulder of the crosshead. A channel may fluidically couple the groove formed on the first side of the slide ring to the second side of the slide ring. In this embodiment, the channel, which is in the form of a bore, extends in an essentially axial direction and allows communication between the groove and the low-pressure side of the slide ring.

In an alternate embodiment of the invention, the slide ring may have a plurality of chambers each extending along a common circumference on the first side of the slide ring. Radial grooves extend through ridges disposed between the chambers. The radial grooves extend to the low pressure source disposed in fluidic communication with the second side of the slide ring. The radial groove is open to the counter-surface.

By themselves, channels that are directed radially inward from the groove of a transverse end seal are disclosed in DE-OS 38 13 596. However, these known channels are not incorporated in a slide ring having hydraulic pressure exerted on it in an axial direction. Rather, the seal disclosed in DE-OS 38 13 596 is pressed against the inner circumference of the hollow roll in a radial direction by hydraulic pressure, and the radial channels serve to relieve the pressure on the sliding surfaces by shunting the pressure.

Further features, advantages, and embodiments of the invention will become apparent from consideration of the following detailed description, drawings and appended claims.

DETAILED DESCRIPTION

Figure 1:
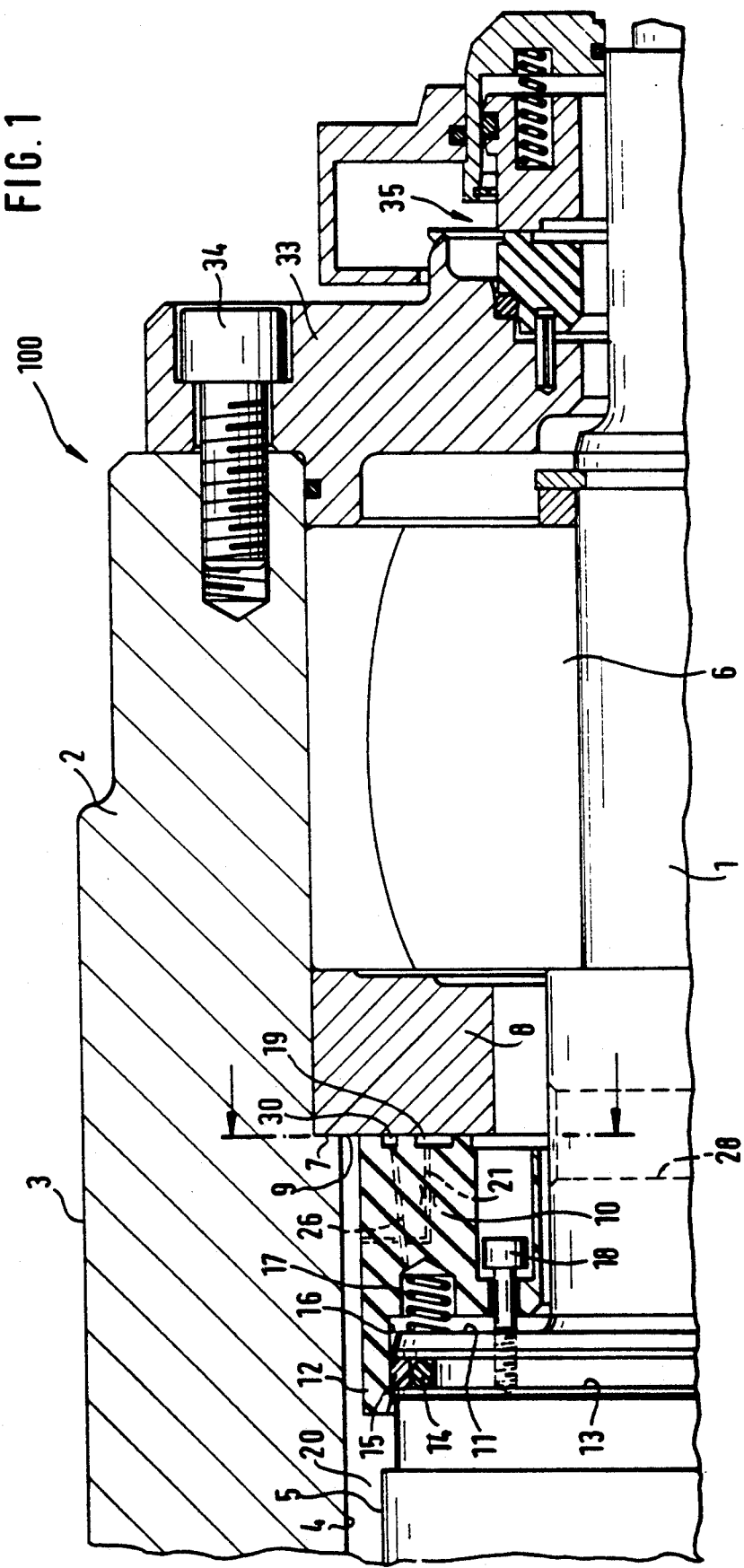
FIG. 1 illustrates a partial longitudinal section through the right-hand end of a flexure-controllable roll having a transverse end seal constructed according to the principles of the invention.

The roll 100 illustrated in FIG. 1 comprises a stationary crosshead 1 that extends through a rotatable hollow cylinder 2 having an outer circumference 3 and an inner circumference 4. The inner circumference 4 forms an annular clearance space 20 with the external circumference 5 of the crosshead. The hollow cylinder 2 is supported by self-aligning journal bearings 6 that are mounted on the crosshead 1. The hollow cylinder 2 has a radial step 7 on the inner circumference 4. A counter-ring 8 that rotates with the hollow cylinder 2 is disposed between, and axially abuts, the radial step 7 and the self-aligning journal bearing 6. The counter-ring 8, which surrounds the crosshead 1, has on its inwardly facing side (i.e., the left side in FIG. 1) a sliding surface 9 that is perpendicular to the axis of the hollow cylinder 2. The sliding surface 9 sealingly abuts a slide ring 10 that is mounted on the crosshead 1 with play and which has some freedom of motion.

The slide ring 10 has a substantially rectangular cross section and abuts against a radial shoulder 11 of the crosshead 1. The slide ring 10 has an axial shoulder 12 on its side nearest the hollow cylinder 2. The axial shoulder 12 engages over the radial shoulder 11 of the crosshead 1. An annular recess 13 is provided in the radial shoulder 11. The annular recess 13 is disposed near the axial shoulder 12. An O-ring 14 is provided in the base of the annular recess 13. Disposed on the outer side of the O-ring 14 is a ring 15 made of polytetrafluoroethylene that has a substantially rectangular cross section. The outer side of the ring 15 sealingly abuts against the inner circumference 16 of the axial shoulder 12. A narrow clearance gap is formed between the inner circumference 16 and the adjacent portion of the outer circumference of the crosshead 1. This clearance gap allows the slide ring 10 to undergo small displacements relative to the crosshead 1. These small displacements of the slide ring 10 compensate for the deflection of the crosshead 1 when roll 100 is under a load.

The slide ring 10 is axially compressed against the counter-ring 8 by axial helical compression springs 17 which abut against the radial shoulder 11. Screws 18 are distributed over the periphery of the slide ring 10 in order to prevent it from rotating with the hollow cylinder 2. The screws 18 axially penetrate into the radial shoulder of the crosshead 1.

On the surface of the slide ring 10 nearest the sliding surface 9, the slide ring 10 has several circumferential chambers 19, which taken together extend over almost the entire circumference of the slide ring 10. The chambers 19 are in fluidic communication with the clearance space 20 via a throttled channel 21. The clearance space 20 is under high pressure. The throttled channel 21 is only indicated schematically in FIG. 1.

Figure 2:
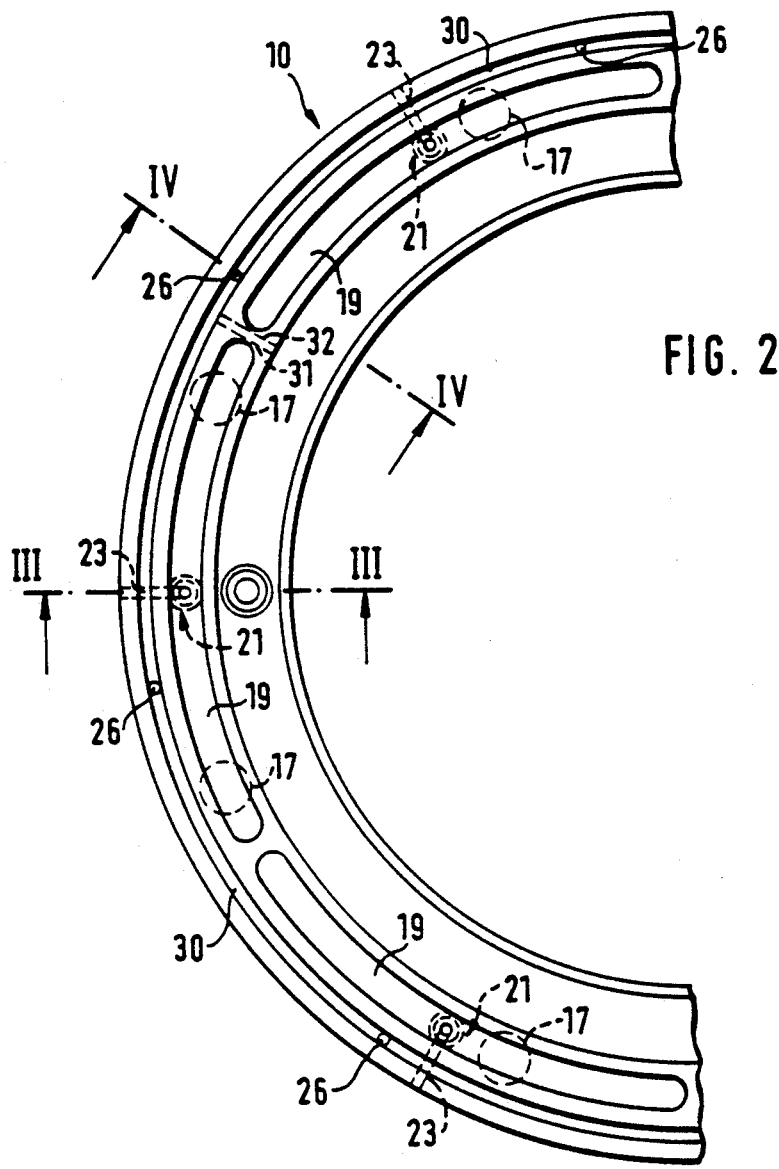
FIG. 2 illustrates a partial view of a 180° region of the transverse end seal taken along line II—II in FIG. 1.
Figure 3:
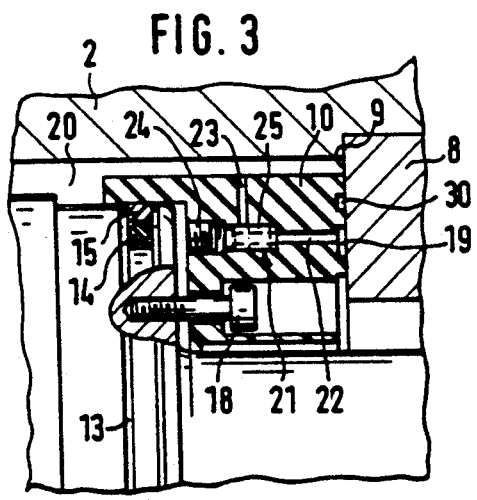
FIGS. 3 and 4 show sectional views taken along lines III—III and IV—IV, respectively, in FIG. 2.

The design of the present invention is shown in more detail in FIGS. 2 and 3. The throttled channel 21 consists of a bore 22 extending in the axial direction which opens into a chamber 19. The end of the bore 22 opposite the chamber 19 is closed by a plug 24. A radial bore 23 is provided between the plug 24 and the chamber 19 which communicates with the clearance space 20 when under pressure. The radial bore 23 allows the hydraulic fluid to pass into chamber 19 in a throttled manner through a throttle insert 25 that is disposed in bore 22.

As seen in the embodiment of the invention illustrated in FIG. 2, there are six chambers 19 distributed over the circumference of the slide ring 10 (only three of which are shown). Each of these chambers 19 communicate with the clearance space 20 via the channel 21.

Figure 4:
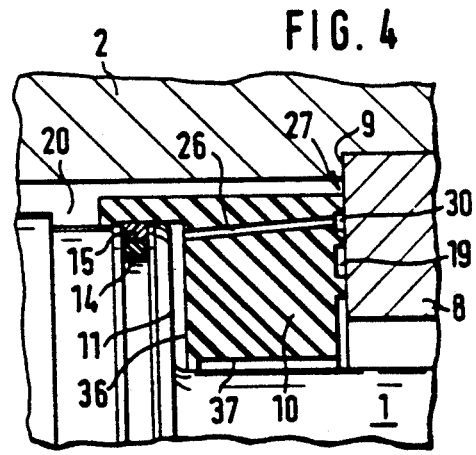

On the surface of the slide ring 10 nearest the sliding surface 9 is a narrow groove 30, which is continuous over 360°, and which is concentric with the circumferential chambers 19. The narrow groove 30 extends radially outside the circumferential chambers 19 and is only a few millimeters from the outer edge of the sliding surface 9. The narrow groove 30 may have a depth and width of 3 mm, for example. The narrow groove 30 communicates with the low-pressure side of the slide ring 10 via one or more channels 26, which are only schematically illustrated in FIG. 1. The channels 26 are shown in greater detail in FIG. 4. The low pressure side of the slide ring 10 is indicated by the end face 36, which is on the side of the slide ring 10 opposite the sliding surface 9. The end face 36 is isolated from the high-pressure clearance space 20 by the sealing ring pair 14 and 15. The end face 36 is axially spaced from the radial shoulder 11, forming a clearance therebetween. In addition, the inner circumference 37 of slide ring 10 is radially spaced from the adjacent portion of crosshead 1 to form a clearance therebetween. Hydraulic fluid passing through channel 26 can therefore flow through these clearances. As a result, hydraulic fluid that is under high pressure and which flows into the clearance space 20 at point 27 in FIG. 4 is immediately removed before it can lift the slide ring 10 off the sliding surface 9. Therefore, the desired sealing and sliding properties of slide ring 10 in the vicinity of the circumferential chambers 19 are unaffected by the high pressure of the hydraulic fluid.

The leakage fluid under high pressure that has passed through the clearance space 20 at the sliding surface 9 and at the seal 15 can be removed by a channel 28.

FIG. 2 illustrates an alternate embodiment that does not use the channels 26. This alternate embodiment can only be utilized if the chamber 19 is not continuous over the entire circumference of the face of slide ring 10 nearest the sliding surface 9. Rather, in this embodiment, the chamber 19 must be composed of separate chambers 19 each of which occupy only a segment of the circumference, leaving a ridge 31 between them. A radial groove 32 in the surface of slide ring 10 extends radially inwardly from the narrow groove 30 through ridge 31. The radial groove 32 is exposed to the sliding surface 9. The radial groove 32, like the channel 26, can reduce the pressure in groove 30 by providing access to the low-pressure side of slide ring 10. However, the integrity of circumferential chambers 19 adjacent to the radial groove 32 must not be breached (i.e., they must be completely enclosed in the plane parallel to the sliding plane 9, otherwise they could not perform their function).

The hollow cylinder 2 is closed at the end by a cover 33 which is attached to the hollow cylinder 2 by screws 34. The cover 33, which rotates with the hollow cylinder 2, is sealed from the crosshead 1 by an additional slide ring seal 35. This seal 35 does not have to form a seal that can withstand a particularly high pressure; it is only intended to prevent leakage of hydraulic fluid from the roll 100.

What is claimed is:

1. A transverse end seal for a flexure-controllable roll including a rotatable hollow cylinder having a longitudinal axis, an inner circumference, and an outer working circumference, a stationary crosshead extending lengthwise through the hollow cylinder to form a surrounding clearance space with the inner circumference of the hollow cylinder, a radially extending shoulder formed between portions of the crosshead that have differing diameters, and hydraulic support means disposed at the crosshead and acting against the inner circumference for supporting the hollow cylinder, said transverse end seal being mountable at an end of the hollow cylinder to seal the surrounding clearance space and comprising:

a slide ring having a first side disposed in a sliding plane perpendicular to the longitudinal axis of the hollow cylinder and a second side remote from the first side to which a source of low pressure may be conducted, said slide ring being displaceable in a direction parallel to the longitudinal axis when mounted on a crosshead;

an annular, axially extending shoulder formed on an outer periphery of said slide ring, said axially extending shoulder having an inner circumference and extending from the second side of said slide ring, said axially extending shoulder of the slide ring extending axially over the radially extending shoulder of the crosshead when mounted thereon;

an annular seal sealingly abutting against said inner circumference of said axially extending shoulder of said slide ring;

at least one circumferentially extending chamber disposed in the first side of the slide ring and being enclosed in the sliding plane, said at least one chamber having an opening extending in a direction parallel to the longitudinal axis;

a counter-surface carried by the rotatable hollow cylinder such that the first side of the slide ring abuts the counter-surface to form a seal therebetween and the opening in the chamber faces the counter-surface; and a groove disposed in the first side of the slide ring and extending over an entire circumference thereof, said groove being located radially outside said at least one chamber and facing the counter-surface, said groove communicating with the source of low pressure whereby pressurized hydraulic fluid from the surrounding clearance space may be conducted from the groove to the low pressure source without destroying the integrity of the seal.

2. The transverse end seal of claim 1 wherein said counter-surface is formed as a separate ring fixed to the hollow cylinder.

3. A flexure-controllable roll comprising a rotatable hollow cylinder having a longitudinal axis, an inner circumference, and an outer working circumferences, a stationary crosshead extending lengthwise through the hollow cylinder to form a surrounding clearance space with the inner circumference of the hollow cylinder, a radially extending shoulder formed between portions of the crosshead that have differing diameters, and hydraulic support means disposed at the crosshead and acting against the inner circumference for supporting the hollow cylinder, and a transverse end seal, said transverse end seal being mounted at an end of the hollow cylinder to seal the surrounding clearance space and comprising:

a slide ring having a first side disposed in a sliding plane perpendicular to the longitudinal axis of the hollow cylinder and a second side remote from the first side to which a source of low pressure may be conducted, said slide ring being displaceable in a direction parallel to the longitudinal axis when mounted on the crosshead;

an annular, axially extending shoulder formed on an outer periphery of said slide ring, said axially extending shoulder having an inner circumference and extending from the second side of said slide ring, said axially extending shoulder of the slide ring extending axially over the radially extending shoulder of the crosshead when mounted thereon;

an annular seal sealingly abutting against said inner circumference of said axially extending shoulder of said slide ring;

at least one circumferentially extending chamber disposed in the first side of the slide ring and being enclosed in the sliding plane, said at least one chamber having an opening extending in a direction parallel to the longitudinal axis;

a counter-surface carried by the rotatable hollow cylinder such that the first side of the slide ring abuts the counter-surface to form a seal therebetween and the opening in the chamber faces the counter-surface; and a groove disposed in the first side of the slide ring and extending over an entire circumference thereof, said groove being located radially outside said at least one chamber and facing the counter-surface, said groove communicating with the source of low pressure whereby pressurized hydraulic fluid from the surrounding clearance space may be conducted from the groove to the low pressure source without destroying the integrity of the seal.

4. The combination of claim 3 wherein a transverse end seal is provided at each end of the roll.

5. The combination of claim 3 wherein said annular seal comprises:
   an annular recess formed in the radially extending shoulder of said crosshead;
   an O-ring disposed in said annular recess; and
   a ring mounted on said O-ring to extend radially over said O-ring and axially over the entire width of the annular recess, said ring abutting against the inner circumference of the axially extending shoulder of the slide ring and having a low coefficient of friction to facilitate movement relative to the slide ring.

6. The combination of claim 5 wherein said slide ring is composed of polytetrafluoroethylene.

7. The combination of claim 6 wherein said at least one chamber comprises a plurality of chambers each extending along a common circumference on the first side of the slide ring and further comprising radial grooves extending through ridges disposed between said chambers to the low pressure source disposed in fluidic communication with the second side of the slide ring, said radial groove being open to the counter-surface.

8. The combination of claim 6 wherein said slide ring has an inner circumference radially spaced from an adjacent portion of the crosshead over which the slide ring is mounted and said second side of the slide ring is axially spaced from said radial shoulder from the crosshead.

9. The combination of claim 8 further comprising a channel fluidically coupling said groove formed on the first side of the slide ring to an outer portion of the second side of the slide ring.

10. The combination of claim 5 wherein said slide ring has an inner circumference radially spaced from an adjacent portion of the crosshead over which the slide ring is mounted and said second side of the slide ring is axially spaced from said radial shoulder of the crosshead.

11. The combination of claim 10 further comprising a channel fluidically coupling said groove formed on the first side of the slide ring to an outer portion of the second side of the slide ring.

12. The combination of claim 5 wherein said at least one chamber comprises a plurality of chambers each extending along a common circumference on the first side of the slide ring and further comprising radial grooves extending through ridges disposed between said chambers to the low pressure source disposed in fluidic communication with the second side of the slide ring, said radial groove being open to the counter-surface.

* * * * *